United States Patent
Goto et al.

(10) Patent No.: US 6,450,311 B2
(45) Date of Patent: Sep. 17, 2002

(54) AUTOMATIC OPERATING APPARATUS FOR A FRICTION CLUTCH

(75) Inventors: Kazuo Goto; Mikihiro Kito, both of Nagoya (JP)

(73) Assignee: Aichi Kikai Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/781,249

(22) Filed: Feb. 13, 2001

(30) Foreign Application Priority Data

Jun. 9, 2000 (JP) ........................................ 2000-174349

(51) Int. Cl.$^7$ .................... F16D 25/12; B60K 41/06; F02D 29/00
(52) U.S. Cl. ................ 192/20; 192/91 R; 192/84.6; 192/90; 192/30 W; 74/100.1
(58) Field of Search ............... 192/20, 30 W, 192/84.6, 85 R, 90, 91 R; 74/89.14, 100.1

(56) References Cited

U.S. PATENT DOCUMENTS

| | | | | |
|---|---|---|---|---|
| 4,828,093 A | * | 5/1989 | Bertin et al. | 192/90 |
| 4,852,419 A | * | 8/1989 | Kittel et al. | 192/84.6 |
| 5,065,850 A | * | 11/1991 | Bertin et al. | 192/113.5 |
| 5,135,090 A | * | 8/1992 | Bertin et al. | 192/82 P |
| 5,680,916 A | | 10/1997 | Borschert | |
| 6,026,945 A | * | 2/2000 | Imao et al. | 185/40 R |

FOREIGN PATENT DOCUMENTS

DE  4433824  3/1996

* cited by examiner

Primary Examiner—Sául Rodriguez
(74) Attorney, Agent, or Firm—Dennison, Schultz & Dougherty

(57) ABSTRACT

The object is to provide a small-sized automatic operating apparatus for a friction clutch. In an automatic operating apparatus 1 for a friction clutch in which the rotation of a motor 2 is reduced by a reduction mechanism 3 to rotate a crank 4, thereby axially moving an output rod 6 for connecting and disconnecting a friction clutch, a spring type accumulator 7 provided immovably on the casing 8 is connected with a crank 4 through a link 5. During connection of the friction clutch, the accumulator 7 accumulates the force received through the crank 4 and the link 5 from the output rod 6 axially moving in the direction of the arrow 'a' by receiving the pushing force of a piston rod in a hydraulic cylinder. During disconnection of the friction clutch, the accumulator 7 releases the accumulated force through the link 5 into the crank 4, thereby aiding the axial movement of the output rod 6 in the direction of the arrow 'b'. Consequently, it is not required to make a space for swaying of the accumulator 7, as differed from the case of the conventional automatic clutch operating apparatus. As a result, it becomes possible to constitute the automatic operating apparatus 1 for a friction clutch in a smaller size.

6 Claims, 3 Drawing Sheets

AUTOMATIC OPERATING APPARATUS FOR A FRICTION CLUTCH

BACKGROUND OF THE INVENTION

1. Field of the Invention

The present invention relates to an automatic operating apparatus for performing the connection and disconnection of a friction clutch for an automatic transmission by converting the rotation of a motor into the axial movement of a piston rod in a hydraulic cylinder.

2. Prior Art

In an automatic transmission, it is known to use an automatic operating apparatus for performing the connection and disconnection of a friction clutch by converting the rotation of a motor into the axial movement of a piston rod in a hydraulic cylinder. Such an automatic operating apparatus for a friction clutch has been disclosed in the Federal Republic of Germany unexamined patent publication No. 4433824. FIG. 3 is a diagramatic plan view of an automatic operating apparatus for a friction clutch disclosed in the above-described unexamined patent publication. In this automatic clutch operating apparatus 51, during connecting the friction clutch (not shown) by rotation of a motor 52, a piston rod 54 is pushed out of a hydraulic cylinder 53 and a crank 56 is rotated. Accordingly, an accumulating means (or spring device) 55, which is provided rotatably on a casing 57, is swayed. Further, the accumulating means (or spring device) 55 receives the pushing force of the piston rod 54 through the crank 56, accumulating the force.

Next, when the motor 52 is driven to rotate in the direction to disconnect the friction clutch, the accumulating means (or spring device) 55 is swayed according to the rotation of the crank 56. At the same time, the accumulating means (or spring device) 55 applies the accumulated force through the crank 56 to the piston rod 54, aiding the driving force of the motor 52 and serving to help the disconnecting motion of the friction clutch. Further, the accumulating means 55 is formed in a large size to keep the disconnecting state of the friction clutch when the whole pressure of the friction clutch is large. As described above, in the conventional automatic clutch operating apparatus 51, the accumulating means (or spring device) 55 is swayed according to the rotation of the crank 56. Consequently, it is required to consider a space for swaying of the accumulating means, so that there is a question of the whole apparatus becoming large in the size.

SUMMARY OF THE INVENTION

An object of the present invention is to provide an automatic operating apparatus for a friction clutch which apparatus is smaller in the size than the conventional automatic clutch operating apparatus 51.

The foregoing object is accomplished in an automatic operating apparatus for a friction clutch defined in the following claims.

In the automatic operating apparatus for a friction clutch defined in the following claim 1, the accumulating means does not sway owing to being provided immovably on the casing of the apparatus. Consequently, there is no need to provide a space for swaying, and the occupied space for the accumulating means may be small. As a result, the automatic operating apparatus for a friction clutch according to the present invention can be constituted in a smaller size as compared to the conventional one.

DESCRIPTION OF THE PREFERRED EMBODIMENT

Figure 1:
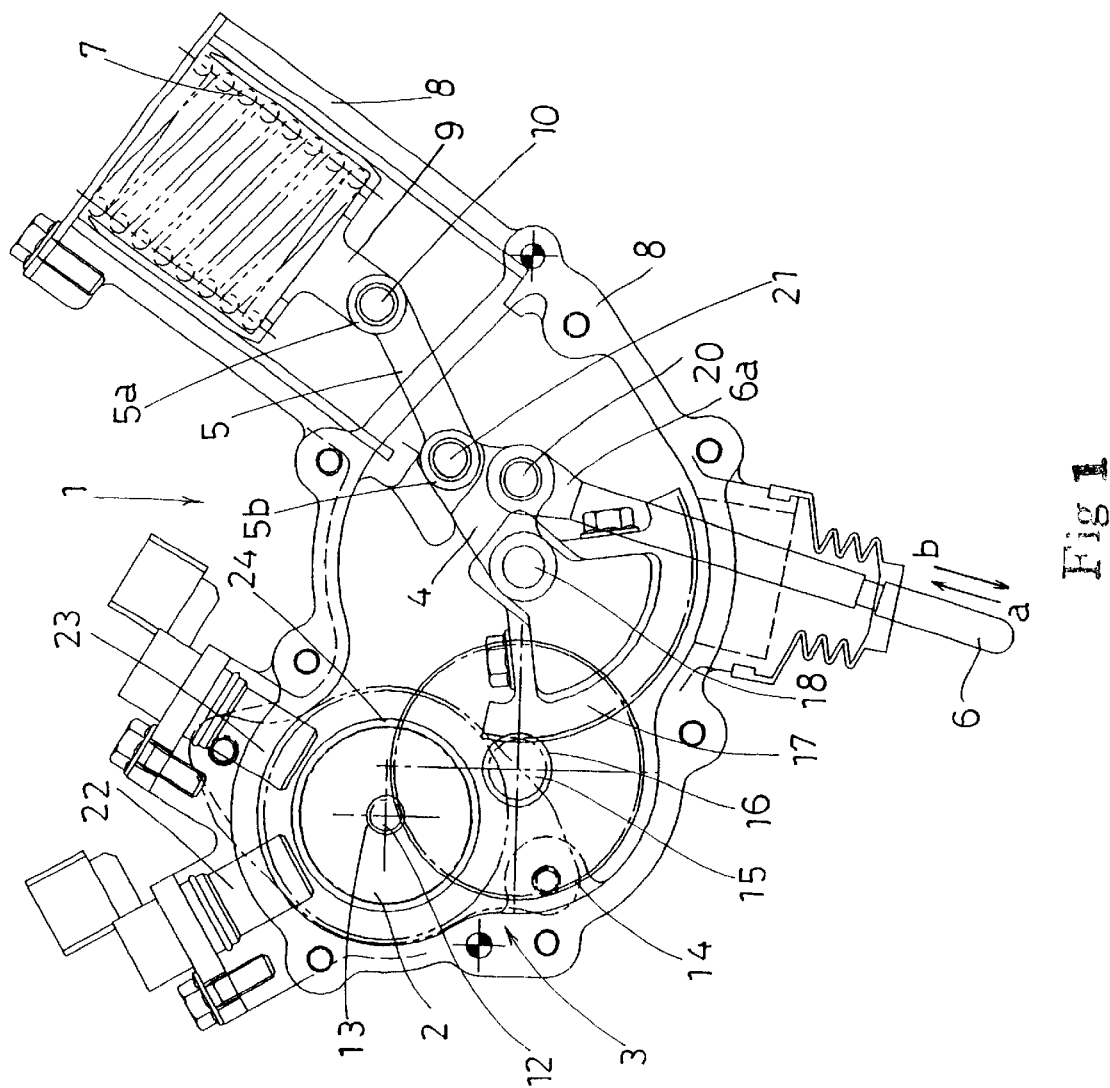
FIG. 1 is a plan view of an automatic operating apparatus for a friction clutch of the present invention in the connected condition of the clutch.

An embodiment of the present invention will be described hereinafter in detail with reference to the drawing. FIG. 1 is a plan view of an automatic operating apparatus 1 for a friction clutch in such a condition that an upper casing has been removed from a casing 8 of the appratus.

As shown in FIG.1, the automatic clutch operating apparatus 1 is provided with a motor 2 rotatable forward and backward, which motor 2 is provided on the casing 8. While the motor 2 is driven to rotate, the rotation is reduced through a reduction mechanism 3 to be described later, driving a crank (or movement conversion means) 4. The crank 4 is connected with an output rod 6, which rod 6 is moved axially while the crank 4 is driven. When the output rod 6 is moved axially, a piston rod of a hydraulic cylinder (not shown) is also moved axially, performing the connection and disconnection (or release) of the friction clutch (not shown).

Further, a spring type accumulator 7 is fixed to the casing 8 at the root end surface and a connecting portion 9, which is provided on the tip end (or free end), is connected with one end 5a of a link 5 by means of a pin 10.

The foregoing reduction mechanism 3 is constituted as follows. That is, the first gear 13 is formed on the rotating shaft 12 of the motor 2 and the second gear 14 is provided on a shaft 15. The second gear 14 is engaging with the first gear 13 to reduce the rotation of the rotating shaft 12 of the motor 2. This shaft 15 is rotatably supported by the casing 8 and on the shaft 15 is formed the third gear 16. Further, the fourth gear 17, which is made of synthetic resin, is provided on an output shaft 18. The fourth gear 17 is engaging with the third gear 16 to reduce the rotation of the shaft 15. Furthermore, on the output shaft 18 is provided the foregoing crank 4, which rotates integrally with the fourth gear 17. Incidentally, since the fourth gear 17 is made of synthetic resin, it needs not lubricating oil.

With the foregoing crank 4 is rotatably connected the root end portion 6a of the output rod 6 through a pin 20 and the other end portion 5a of the link 5 through a pin 21. Incidentally, since the link 5 is formed in a plate, it is possible to reduce the cost.

Proximity sensors 22, 23 showen in FIG. 1 detect the teeth portion of a circular object 24 provided on the rotating shaft 12 of the motor 2, thereby detecting the number and the direction of rotations of the motor 2.

Next, the operation of the automatic operating apparatus 1 for a friction clutch will be described hereinafter.

First, the operation of the automatic clutch operating apparatus 1 will be described when the friction clutch is connected. While the motor 2 is driven to rotate in the direction that the friction clutch (not shown) is connected, the rotation of the rotating shaft 12 of the motor 2 is reduced through the reduction mechanism 3 and the crank 4 is rotated anticlockwise in FIG. 1. At the same time, the piston rod of a hydraulic cylinder (not shown), which is receiving the reaction force of the spring in the friction clutch, pushes the output rod 6 in the direction of the arrow 'a'. Thereby, the link 5 is swayed into the position shown in FIG. 1 and simultaneously the spring type accumulator 7 is compressed as shown in FIG. 1. At this time, the friction clutch is in the completely connected state. Incidentally, in the state of FIG. 1, the input point of the link 5 is. over the dead point of the output shaft 18, so that the connected state of the friction clutch is kept mechanically.

Figure 2:
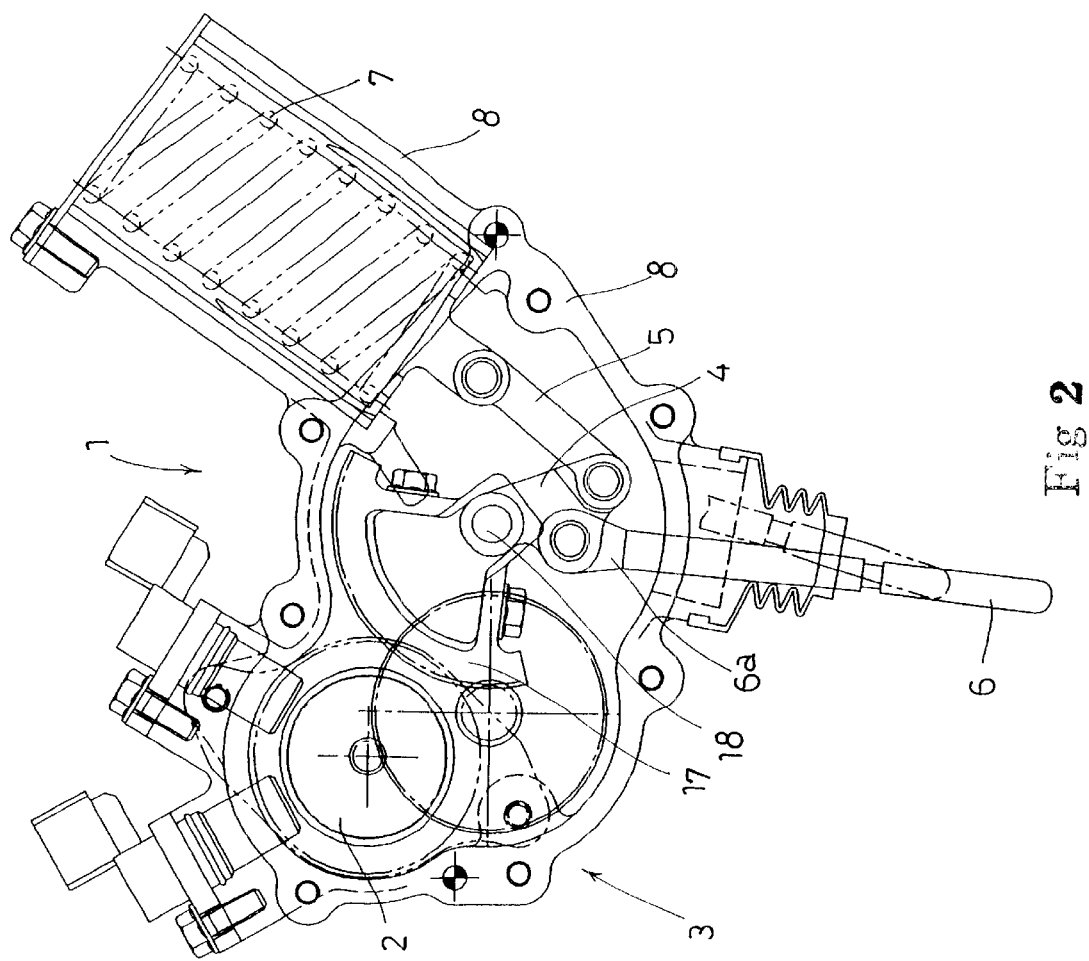
FIG. 2 is a plan view, similar to FIG. 1, in the disconnected condition of the clutch.
Figure 3:
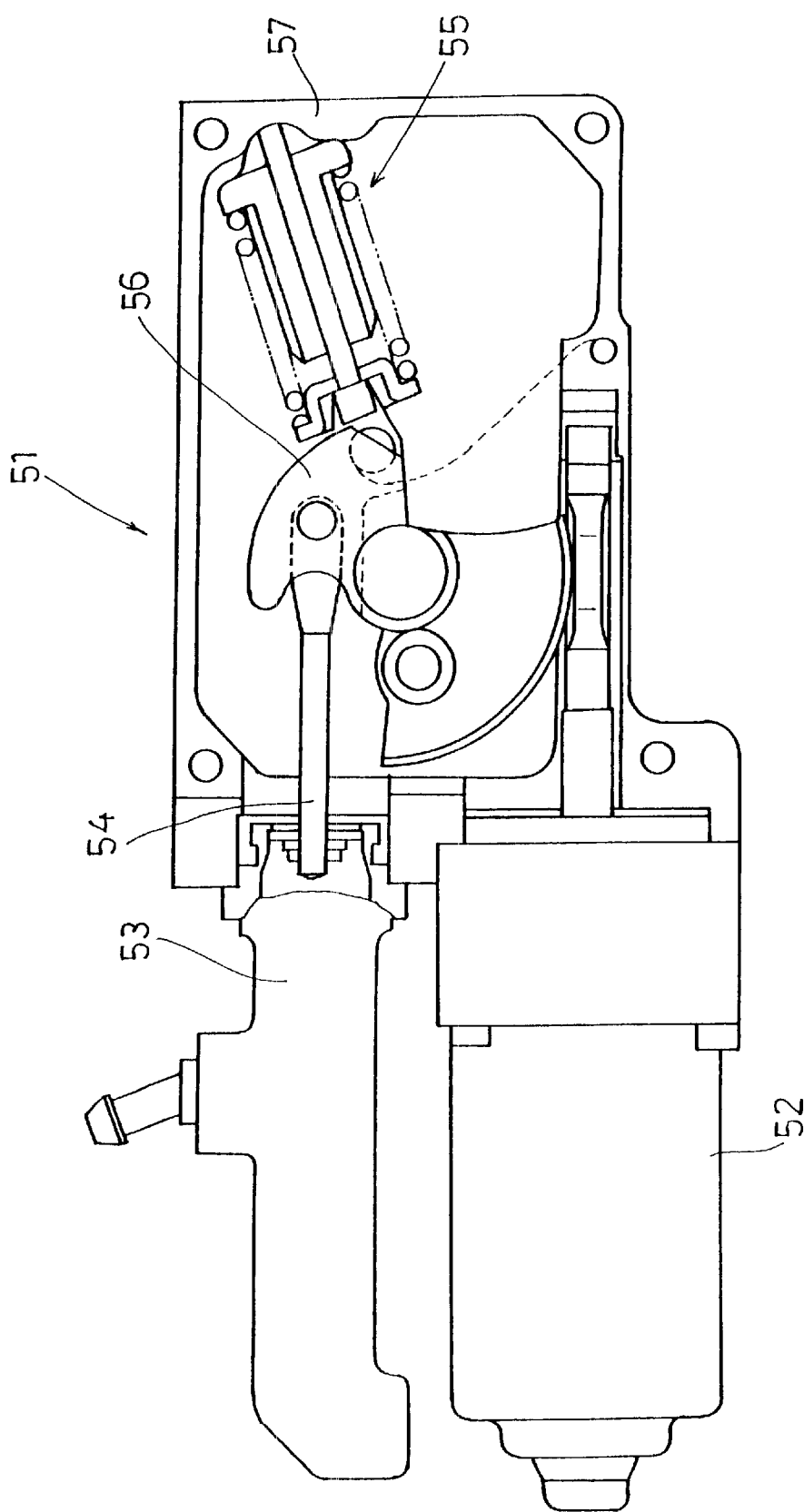
FIG. 3 is a plan view of a conventional automatic operating apparatus for a friction clutch.

Second, the operation of the automatic clutch operating apparatus 1 will be described when the friction clutch in the connected state is disconnected (or released). While the motor 2 is driven to rotate in the direction that the friction clutch (not shown) is disconnected (or released), the rotation of the rotating shaft 12 of the motor 2 is reduced through the reduction mechanism 3 and the crank 4 is rotated clockwise in FIG. 1. Thereby, the output rod 6 is moved axially in the direction of the arrow 'b'. At the same time, the spring type accumulator in the compressed state becomes into an extended state as shown in FIG. 2. Consequently, the accumulated force (or reaction force) stored in the spring type accumulator 7 is applied to the output rod 6 through the link 5 and the crank 4. Thereby, the accumulated force aids the rotating force of the motor 2 which is driving to move the output rod 6 axially in the direction of the arrow 'b', so that the friction clutch is promptly disconnected. Incidentally, in the state of FIG. 2, the input point from the output rod 6 is over the dead point of the output shaft 18, so that the disconnected (or released) state of the friction clutch is kept mechanically.

As clearly known from the foregoing description, in the automatic clutch operating apparatus 1, it is not necessary to keep the disconnected (or released) state of the friction clutch mechanically by means of the spring type accumulator 7 only, as differed from the conventional automatic clutch operating apparatus 51. As a result, it becomes possible to make the spring type accumulator 7 into a smaller size. Further, since the spring type accumulator 7 is provided immovably on the casing 8, it is not required to make a space for swaying, as differed from the case of the conventional automatic clutch operating apparatus 51. Consequently, it becomes possible to constitute an automatic clutch operating apparatus 1 in a smaller size.

What is claimed is:

1. An automatic operating apparatus for a friction clutch, comprising:
    a motor rotatable forward and backward;
    a reduction means for reducing the rotation of said motor;
    a movement conversion means for converting the rotation transmitted from said reduction means into the axial movement of a piston rod;
    a hydraulic cylinder including said piston rod for connecting and disconnecting a friction clutch;
    an accumulating means provided immovably on the casing of the apparatus so as to accumulate the pushing force of said piston rod during connection of said friction clutch and so as to aid the axial movement of the piston rod of said hydraulic cylinder by means of said accumulated force during disconnection of said friction clutch;
    a link means provided connectively between said movement conversion means and said accumulating means so as to sway according to the motion of said movement conversion means, wherein said link means further includes a first link member, a second link member, and a third link member, wherein said second link member is pivotally connected to said accumulating means via a first pin at one end, and pivotally connected to said first link member via a second pin, and wherein said third link member is connected to said hydraulic cylinder and is pivotally connected to said first link member via a third pin wherein said second pin and said third pin are disposed at different positions;
    said link means transmitting the pushing force of said piston rod to said accumulating means during connection of said friction clutch; and
    said link means transmitting the accumulated force of said accumulating means to said movement conversion means during disconnection of said friction clutch.

2. An automatic operating apparatus for a friction clutch as defined in claim 1, wherein said accumulating means comprises a spring.

3. An automatic operating apparatus for a friction clutch as defined in claim 1, wherein said link is formed in a plate.

4. An automatic operating apparatus for a friction clutch as defined in claim 1, further comprising a proximity sensor provided around the rotating shaft of said motor so as to detect the number and the direction of rotations of said motor.

5. An automatic operating apparatus for a friction clutch as defined in claim 1, wherein said reduction means further includes a first gear, a second gear, a third gear, and a fourth gear, said first gear is disposed on a first rotating shaft of said motor, said second gear and said third gear are disposed on a common second shaft, said second gear engages with said first gear to reduce the rotation of said first rotating shaft, and said fourth gear is disposed on a third output shaft and engages with said third gear to reduce the rotation of said common second shaft.

6. An automatic operating apparatus for a friction clutch as defined in claim 5, wherein the fourth gear is made of synthetic resin.

* * * * *